US010618678B1

(12) United States Patent
Tilley

(10) Patent No.: US 10,618,678 B1
(45) Date of Patent: Apr. 14, 2020

(54) SELF-BALANCING SOLAR ARRAY

(71) Applicant: Space Systems/Loral, LLC, Palo Alto, CA (US)

(72) Inventor: Scott William Tilley, Los Altos Hills, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 1212 days.

(21) Appl. No.: 14/918,337

(22) Filed: Oct. 20, 2015

(51) Int. Cl.
*B64G 1/40* (2006.01)
*B64G 1/44* (2006.01)

(52) U.S. Cl.
CPC ............. *B64G 1/405* (2013.01); *B64G 1/443* (2013.01)

(58) Field of Classification Search
CPC .. G05D 1/0883; B64G 2001/245; B64G 1/26; B64G 1/40; B64G 1/44; B64G 1/443
See application file for complete search history.

(56) References Cited

U.S. PATENT DOCUMENTS

| | | | | |
|---|---|---|---|---|
| 3,838,834 A | * | 10/1974 | Michaelis | B64G 1/32 136/292 |
| 4,133,502 A | * | 1/1979 | Anchutin | B64G 1/443 136/245 |
| 4,732,354 A | * | 3/1988 | Lievre | B64G 1/28 244/168 |
| 5,141,180 A | * | 8/1992 | Reboux | B64G 1/32 136/292 |
| 5,312,073 A | * | 5/1994 | Flament | B64G 1/24 136/292 |
| 5,413,293 A | * | 5/1995 | Gomberg | B64G 1/32 244/164 |
| 5,597,142 A | * | 1/1997 | Leung | B64G 1/24 244/164 |
| 5,653,407 A | * | 8/1997 | Bertheux | B64G 1/222 244/168 |
| 5,957,411 A | * | 9/1999 | Liu | B64G 1/26 244/164 |
| 5,963,166 A | * | 10/1999 | Kamel | B64G 1/24 342/352 |
| 5,996,942 A | * | 12/1999 | Price | B64G 1/24 244/164 |

(Continued)

OTHER PUBLICATIONS

Lambertson et al., "Solar Array Thermal Snap and the Characteristics of its Effect on UARS," NASA/GSFC, Greenbelt, Maryland, Contract NAS 5-31500, N93-24734, pp. 575-588.

*Primary Examiner* — Richard R. Green
*Assistant Examiner* — Michael A. Fabula
(74) *Attorney, Agent, or Firm* — Weaver Austin Villeneuve & Sampson LLP

(57) ABSTRACT

In an on-orbit configuration, a spacecraft having a center of mass and a pitch axis passing through the center of mass includes a main body, a first solar array, and a first thruster is operable in a geostationary orbit with the first solar array deployed, proximate to a first north or south surface of the main body, such that a rotational axis of the deployed first solar array is substantially parallel to the pitch axis. The first thruster is disposed proximate to a second north or south surface of the main body, the first thruster having a thrust vector that is approximately coaligned with the pitch axis, the second surface being opposite to the first north or south surface. No solar array is proximate to the second surface.

12 Claims, 5 Drawing Sheets

(56) References Cited

U.S. PATENT DOCUMENTS

| | | | | |
|---|---|---|---|---|
| 6,053,455 | A | * | 4/2000 | Price ........................ B64G 1/26 244/169 |
| 6,076,773 | A | * | 6/2000 | Salvatore ............. B64G 1/1007 244/164 |
| 6,293,090 | B1 | | 9/2001 | Olson |
| 6,454,217 | B1 | * | 9/2002 | Rodden .................... B64G 1/24 244/164 |
| 6,481,671 | B1 | | 11/2002 | Blair |
| 6,755,377 | B1 | * | 6/2004 | Levin ........................ B64G 1/32 244/158.2 |
| 6,942,186 | B1 | * | 9/2005 | Levin ...................... B64G 1/648 244/158.2 |
| 7,989,743 | B2 | | 8/2011 | Brinkerhoff et al. |
| 8,505,853 | B2 | * | 8/2013 | Lagadec .............. B64G 1/1021 244/164 |
| 8,868,263 | B2 | | 10/2014 | Munir et al. |
| 2006/0038080 | A1 | * | 2/2006 | Polle ........................ B64G 1/24 244/168 |
| 2010/0020742 | A1 | * | 1/2010 | Goodzeit ............. B64G 1/1007 370/316 |
| 2010/0127892 | A1 | | 5/2010 | Wesselink et al. |
| 2011/0073714 | A1 | * | 3/2011 | Hruby .................... B64G 1/405 244/171.1 |

\* cited by examiner

SELF-BALANCING SOLAR ARRAY

TECHNICAL FIELD

This invention relates generally to a spacecraft, and more particularly to a spacecraft configured with at least one, self-balancing solar array.

BACKGROUND OF THE INVENTION

The assignee of the present invention designs and manufactures spacecraft for, inter alia, communications and broadcast services from geosynchronous orbit. Electrical power for such spacecraft is conventionally generated by one or more photovoltaic solar arrays, each solar array typically having a planar surface, once deployed into an operational on-orbit configuration, of several hundred square feet. Pressure due to solar radiation impingement on the solar array sun-facing planar surface can result in considerable force. To the extent the center of pressure of the solar radiation impingement is offset from the spacecraft center of mass, a significant disturbance torque ("solar torque imbalance") may be developed.

As disclosed in U.S. Pat. No. 6,053,455, assigned to the assignee of the present invention, a geosynchronous satellite may be designed to minimize solar torque imbalance. This may be accomplished, referring now to FIG. 1, Detail A, with a spacecraft configuration providing for a pair of solar arrays that are disposed so as to be symmetric about the spacecraft center of mass. Thus, in the illustrated example, the solar arrays 126(1) and 126(2) are located, respectively on the north and south side of the spacecraft main body 110, and respective torques from the two solar arrays, being of opposite signs, are substantially nulled (or "balanced") out. Alternatively, referring now to FIG. 1, Detail B, a spacecraft configuration is known wherein a solar array 126 is disposed on the north (or south) side of the spacecraft main body 110, and solar torques associated with the solar array 126 are balanced out by disposing a solar sail 129 on the opposite side of the spacecraft main body 110. To the extent there is a remaining solar torque imbalance, the residual disturbance torques may be accumulated in momentum wheels that are then unloaded periodically using thrusters, magnetic torquers, trim tabs, or solar panel angle adjustments.

Geosynchronous spacecraft may include provisions for controlling drift orbit inclination by performing periodic north-south stationkeeping (NSSK) maneuvers. Referring still to FIG. 1, NSSK maneuvers may be performed by thrusters 131. In order to reduce impingement of thruster plume onto the solar array 126 (or solar sail 129), thrusters 131 have been conventionally located proximate to an anti-earth portion of the spacecraft. In order to develop a thrust vector through the spacecraft center of mass 102 the thrusters 131 may be canted by an angle θ of 30° or more away from the north-south (N/S) direction (Y axis). As a result, efficiency of NSSK maneuvers is reduced because the thrusters produce a substantial component of thrust in the Z axis (earth/anti-earth) direction as well as the N/S direction.

SUMMARY

The present disclosure contemplates an improved spacecraft design that includes a solar array configured with equipment to self-balance against solar torques by producing a torque opposite to the torque developed by solar radiation impinging on the solar array.

According to some implementation, a spacecraft has a center of mass and a pitch axis passing through the center of mass and includes a main body, a first solar array and a first thruster. The spacecraft, in an on-orbit configuration, is operable in a geostationary orbit with the first solar array deployed, proximate to a first north or south surface of the main body, such that a rotational axis of the deployed first solar array is substantially parallel to the pitch axis. The first thruster is disposed proximate to a second north or south surface of the main body, the first thruster having a thrust vector that is approximately coaligned with the pitch axis, the second surface being opposite to the first north or south surface, and no solar array being proximate to the second surface. The spacecraft further includes a plurality of thrusters disposed, in the on-orbit configuration, proximate to a distal portion of a deployed mast, the deployed mast extending outboard from the second surface.

In some examples, the spacecraft may further include a second thruster disposed, in the on-orbit configuration, on a distal portion of the deployed first solar array. The second thruster may have a thrust vector that is approximately orthogonal to the pitch axis and aligned with respect to a direction of impinging solar radiation such that firing the second thruster produces a torque opposite to a torque developed by the impinging solar radiation on the deployed first solar array. In some examples, a solar array drive assembly (SADA) may provide the only electrically conductive coupling between the main body and the first solar array, and power for the second thruster may not be conducted through the solar array drive assembly. In some examples, the SADA may configured to rotate the first solar array about the rotational axis. In some examples, the rotational axis may be substantially co-aligned with the pitch axis.

In some examples, the second thruster may include a thruster control electronics unit. The thruster electronics control unit may be communicatively coupled with the main body only by a radio frequency (RF) link between a remote RF node located proximate to the distal portion of the solar array and a spacecraft RF node located proximate to the main body.

In some examples, the second thruster may include a fuel supply module.

In some examples, the second thruster may be one of a colloid thruster, a pulse plasma thruster, a pulsed inductive thruster or a field emission electric propulsion thruster.

In some examples, the spacecraft may include no solar array other than the first solar array.

In some examples, in the on-orbit configuration, payload components may be deployed proximate to the second surface.

In some examples, the first thruster may be configured for performing north south stationkeeping maneuvers.

In some examples, the spacecraft may further include a plurality of thrusters disposed, in the on-orbit configuration, proximate to a distal portion of a deployed mast, the deployed mast extending outboard from the second surface. In some examples, a synthetic thrust vector resulting from firing a selected one or more of the plurality of thrusters may approximately orthogonal to the pitch axis and is aligned with respect to a direction of impinging solar radiation such that firing the selected one or more of the plurality of thrusters produces a torque opposite to a torque developed by the impinging solar radiation on the deployed first solar array.

According to some implementations, a spacecraft has a center of mass and a pitch axis passing through the center of mass. The spacecraft includes a main body, a first solar array, a first thruster and a second thruster disposed on a distal portion of the first solar array. The second thruster has a thrust vector that is approximately orthogonal to the pitch axis and aligned with respect to a direction of impinging solar radiation such that firing the second thruster produces a torque opposite to a torque developed by the impinging solar radiation on the deployed first solar array. A solar array drive assembly (SADA) provides the only electrically conductive coupling between the main body and the first solar array. Power for the second thruster is not conducted through the solar array drive assembly.

In some examples, the spacecraft, in an on-orbit configuration, may be configured to be operable in a geostationary orbit with the first solar array deployed, proximate to a first north or south surface of the main body, such that a rotational axis of the deployed first solar array is substantially parallel to the pitch axis. The first thruster may be disposed proximate to a second north or south surface of the main body, the first thruster having a thrust vector that is approximately coaligned with the pitch axis, the second surface being opposite to the first surface, and no solar array being proximate to the second surface. In some examples, the SADA may be configured to rotate the first solar array about the rotational axis.

In some examples, the second thruster may include a thruster control electronics unit. The thruster control electronics unit may be communicatively coupled with the main body only by a radio frequency (RF) link between a remote RF node located proximate to the distal portion of the solar array and a spacecraft RF node located proximate to the main body.

In some examples, the second thruster may include a fuel supply module.

In some examples, the spacecraft may include no solar array other than the first solar array.

In some examples, the second thruster may be one of a colloid thruster, a pulse plasma thruster, a pulsed inductive thruster or a field emission electric propulsion thruster.

BRIEF DESCRIPTION OF THE DRAWINGS

Features of the invention are more fully disclosed in the following detailed description of the preferred embodiments, reference being had to the accompanying drawings, in which.

Figure 1:
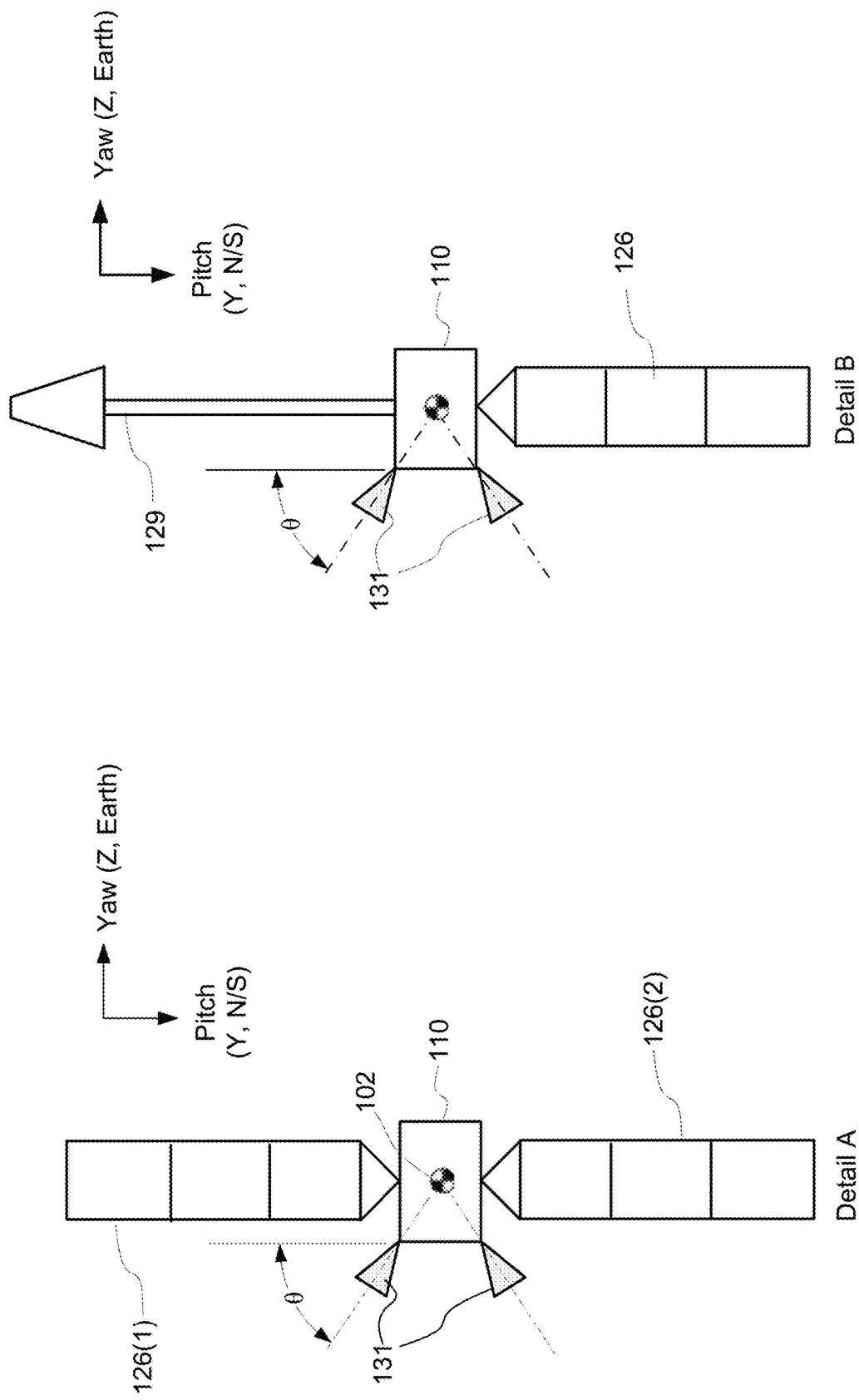
FIG. 1 illustrates conventional solar array placements for a geosynchronous satellite.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. It will be understood that although the terms "first" and "second" are used herein to describe various elements, these elements should not be limited by these terms. These terms are used only to distinguish one element from another element. As used herein, the term "and/or" includes any and all combinations of one or more of the associated listed items. The symbol "I" is also used as a shorthand notation for "and/or".

Figure 2:
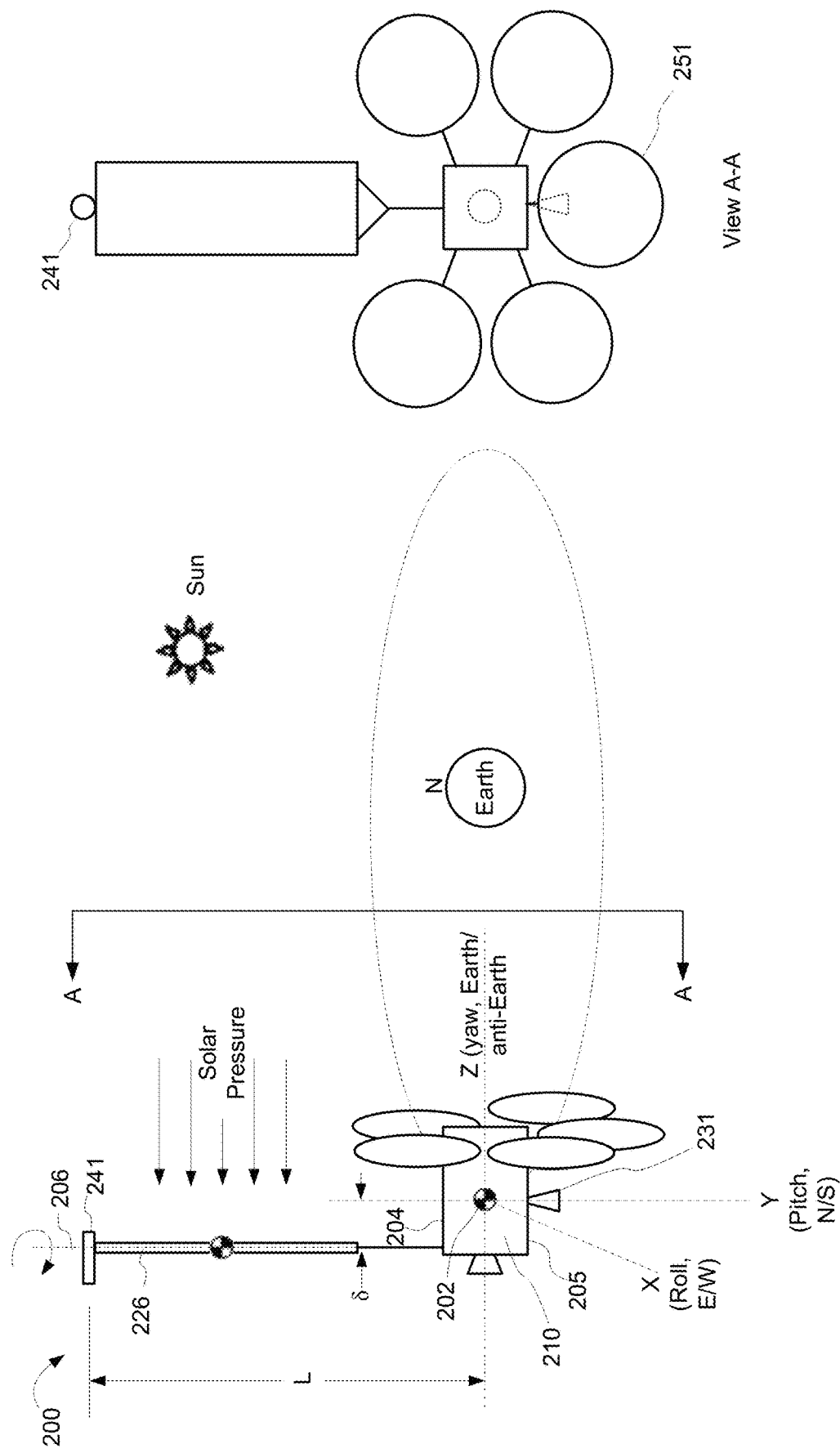
FIG. 2 illustrates a spacecraft in an on orbit configuration including a self-balancing solar array according to an implementation.

The present inventor has appreciated that a geosynchronous satellite may advantageously be configured with a single solar array incorporating largely self-contained provisions for compensating for, or balancing, solar torque. FIG. 2 illustrates a spacecraft 200 in a geosynchronous orbit, according to an implementation. In the illustrated implementation, a solar array 226 is extended, in an on-orbit configuration, outward from a main body 210 of the spacecraft 200. The solar array 226 is configured to rotate (stepwise or continuously) about a rotational axis 206 such that power generating surfaces of the solar array 226 are maintained in a generally sun facing orientation. The rotational axis is substantially parallel to the spacecraft pitch (Y) axis (i.e., orthogonal to the orbital plane, extending along a generally North/South (N/S) oriented axis). In some implementations, the rotational axis 206 of the solar array 226 may be substantially aligned with the spacecraft pitch axis; in other implementations, such as that illustrated in FIG. 2, the solar array 226 is positioned at an offset distance, δ, from the pitch axis along the spacecraft yaw (Z) axis. In the illustrated implementation, the solar array 226 is extended from a north facing surface 204 of the spacecraft main body 210. As a result, a proximal portion of the solar array 226 may be proximate to the north facing surface 204.

In some implementations, a thruster 231 may be disposed on the spacecraft main body 210 opposite to the solar array. In the illustrated implementation, the thruster 231 is disposed proximate to a south facing surface 205. The thruster 231 may be configured to control orbit inclination by performing north south stationkeeping (NSSK) firings. The thruster 231 may be chemical thruster that delivers thrust by converting chemical energy stored in propellant to kinetic energy or an electric thruster that converts electrical energy to propellant kinetic energy substantially without regard to any chemical energy the propellant may possess. If a chemical thruster, the thruster 231 may deliver relatively high thrust of 10-1000 newtons, for example at a specific impulse ($I_{sp}$) up to about 500 seconds. If an electric thruster, the thruster 231 may operate at an $I_{sp}$ of 1000-4000 seconds, at thrust level substantially less than one newton.

Advantageously, the thruster 231 may be oriented so as to produce a thrust vector when firing that has a small or zero cant angle with respect to the pitch axis. As a result, cosine losses that would otherwise be associated with a larger cant angle may be substantially eliminated. Consequently, efficiency of NSSK maneuvers may be substantially improved. As a result, a reduction in propellant mass may permit reduced launch mass (cost) and/or more spacecraft payload for revenue generation. Alternatively or in addition, the illustrated single solar array configuration makes it possible to dispose additional payload, such as antenna reflector 251, in locations that would otherwise unavailable due to a second solar array, as may be more clearly observed in View A-A.

In the illustrated implementation, the solar array 226 includes a low thrust thruster 241 configured to produce a thrust vector that balances out torques resulting from solar radiation pressure. The low thrust thruster 241 may be an electric thruster such as a colloid (electrospray) thruster, a pulse plasma thruster, a pulsed inductive thruster or a field emission electric propulsion thruster. In some implementations, the electric thruster may be configured to operate at a very low thrust (micro newton range) and have a specific impulse of about 1000 seconds. Advantageously, the thruster 241 may be disposed proximate to a distal portion of the solar array 226 so as to provide a desirably large moment arm 'L'. The thruster 241 may be oriented such that, when firing, a thrust is produced having a vector that is approximately orthogonal to the pitch axis, and aligned in parallel with the sun direction. As a result, firing the low thrust thruster 241 may produce a torque opposite in sign to a torque resulting from solar impingement on the solar array 226. Advantageously, the thruster 241 may be mechanically coupled with the solar array 226, such that rotation of the solar array about the axis 206 results in similar rotation of the thruster 241. A thrust range and/or duty cycle of the low thrust thruster 241 may be selectably controlled so as to produce an average torque about the spacecraft center of mass 202 that is approximately equal to the torque resulting from solar impingement on the solar array 226. As a result, solar torque is substantially balanced out. The solar array 226, together with the low thrust thruster 241, may accordingly be referred to as a self-balancing array.

Benefits of the presently disclosed techniques include reducing mass and costs associated with a solar array yoke, hold down equipment and a drive mechanism for a second array, by providing the spacecraft with only a single self-balancing array.

Figure 3:
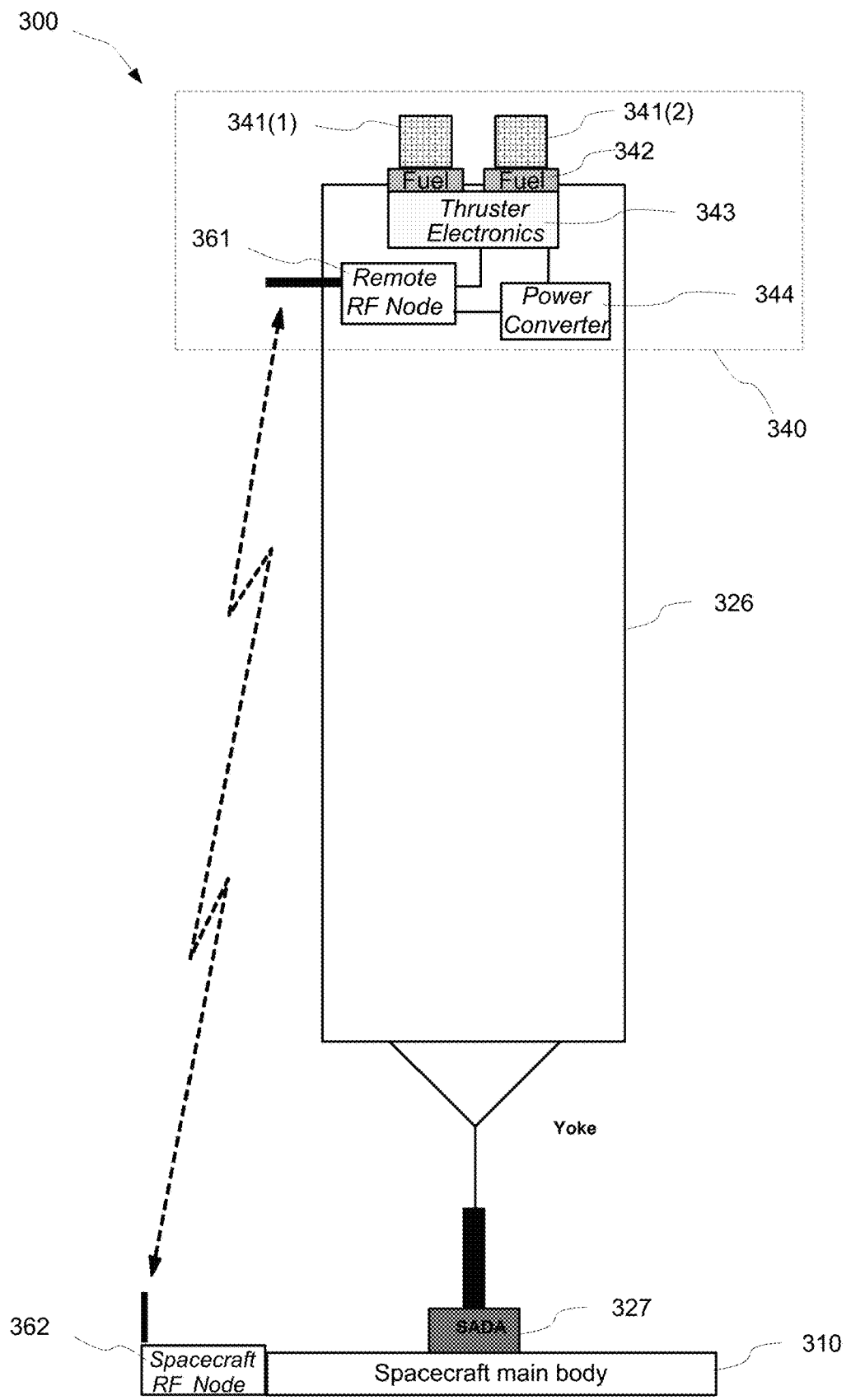
FIG. 3 illustrates an example of a self-balancing solar array according to an implementation.

Referring now to FIG. 3, an example of a self-balancing array will be described. The self-balancing array 300 includes solar array 326, and a pair of low thrust thrusters, 341(1) and 341(2). The self-balancing array 300 is mechanically and electrically coupled with the spacecraft main body 310 by way of a solar array drive assembly (SADA) 327. The SADA is configured to provide the only electrically conductive coupling between the spacecraft main body 310 and the solar array 326. The low thrust thrusters 341 are co-located and disposed on or proximate to a distal portion of solar array 326 together with one or more fuel supply modules 342, and thruster control electronics unit(s) 343. A power converter 344 is configured to provide an electrical interface between the solar array 326 and the thruster electronics unit(s) 343. A remote RF node 361 is configured to provide a wireless telemetry and control interface between the thruster electronics unit(s) 343 and the spacecraft main body 310. In the illustrated implementation, the pair of low thrust thrusters 341 is configured as a primary thruster 341(1) and a redundant thruster 341(2). The power converter is configured to draw power directly from one or more solar cell strings of solar array 326, thereby obviating a need to conduct power to the power converter 344 through the SADA 327. In some implementations, the remote RF node 361 may be communicatively coupled wirelessly with spacecraft RF node 362. The remote RF node 361 and the spacecraft RF node 362 may be part of a wireless local area network (WLAN) and/or comply with a Wi-Fi or other standard wireless protocol.

In the implementation illustrated in FIG. 3, an arrangement 340 of low thrust thrusters 341, fuel supply modules 342, thruster control electronics 343, power converter 344 and remote RF node 361 form a substantially self-contained subsystem for balancing solar torque because neither fuel nor power for the thrusters is required to cross the SADA 327.

Figure 4:
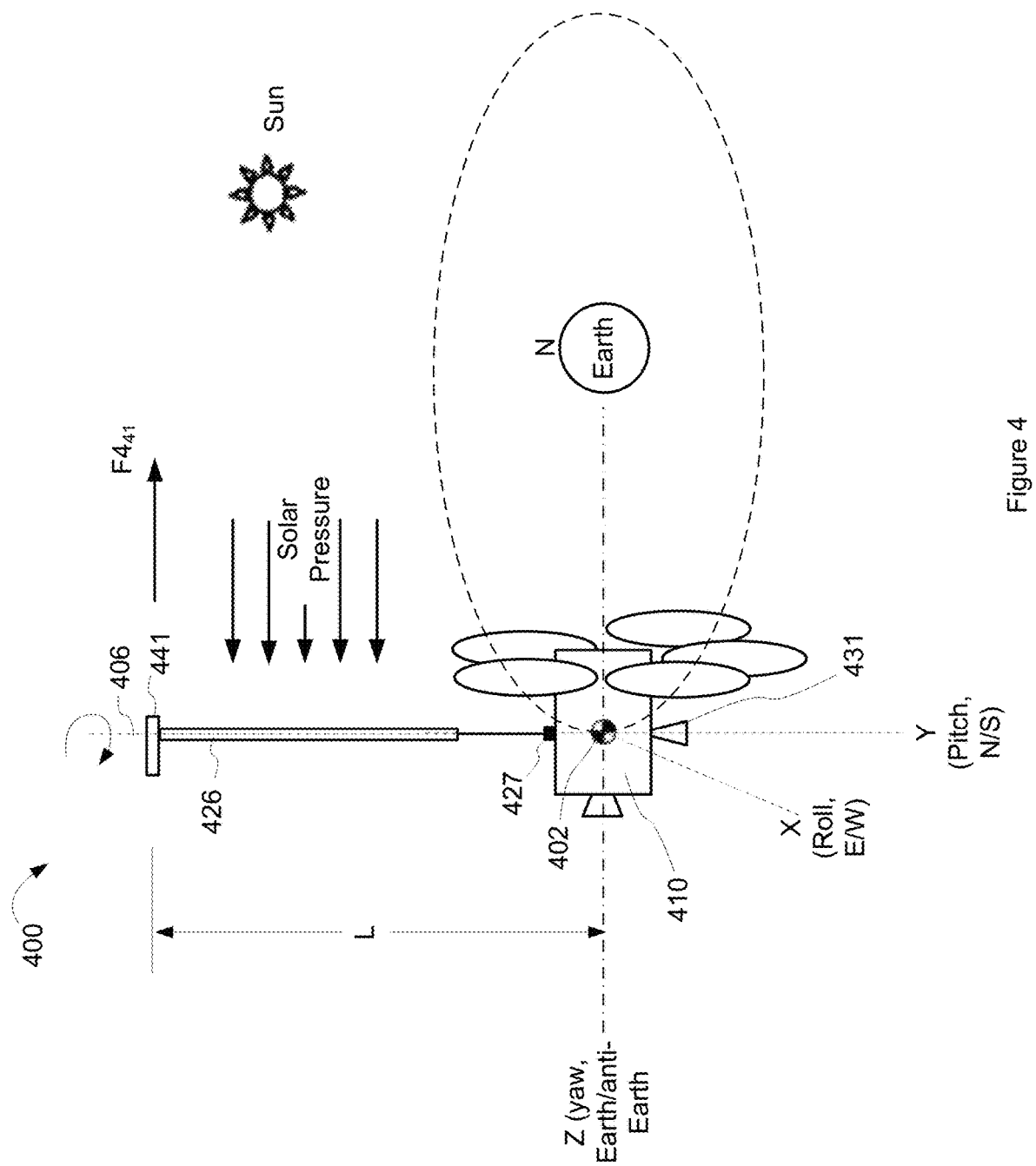
FIG. 4 illustrates a spacecraft in geosynchronous orbit according to an implementation.

FIG. 4 illustrates a spacecraft 400 in geosynchronous orbit, according to an implementation. In the illustrated implementation, a solar array 426 is extended, in an on-orbit configuration, outward from a main body 410 of the spacecraft 400 such that sun facing surfaces of the solar array 426 are substantially parallel to the spacecraft pitch (Y) axis. The solar array 426 may be rotated by a SADA 427 (stepwise or continuously) about a rotational axis 406 such that power generating planar surfaces of the solar array 426 are maintained in a generally sun facing orientation. For example, the SADA 427 may cause a planar surface of the solar array 426 to "track" the sun such that the surface is constantly at an angle approximately perpendicular to a plane defined by the sun and axis of rotation 406. Such a sun-tracking angle may be referred to hereinafter as a "nominal sun pointing direction". It will be understood, however, that a nominal sun pointing direction may not, in general, result in an array surface being perpendicular to the sun direction, because axis of rotation 406 is parallel to the pitch axis, which is normal to the spacecraft orbit plane, with the result that axis of rotation 406 may itself be at an inclination angle with respect to the sun direction.

In the illustrated implementation, a rotational axis 406 of the solar array 426 is substantially aligned with the spacecraft pitch axis.

In the illustrated implementation, a thruster 431 is disposed on the spacecraft main body 410 opposite to the solar array. The thruster 431 may be configured to perform north south stationkeeping (NSSK) firings. Advantageously, the thruster 431 may be oriented so as to produce a thrust vector when firing that has a small or zero cant angle with respect to the pitch axis.

As described above in connection with FIG. 2, a low thrust thruster 441 may be disposed proximate to a distal portion of the solar array 426 so as to provide a desirably large moment arm 'L' and may be oriented such that, when firing, a thrust is produced having a vector that is approximately orthogonal to the pitch axis, aligned in parallel with the sun direction, and directed towards the sun so as to counter solar radiation pressure. As a result, firing the low thrust thruster 441 may produce a torque opposite in sign to a torque resulting from solar impingement on the solar array 426. Advantageously, the thruster 441 may be mechanically coupled with the solar array 426, such that rotation of the solar array about the axis 406 results in similar rotation of the thruster 441. A thrust range and/or duty cycle of the low thrust thruster 441 may be selectably controlled so as to provide that firing the thruster produces an average torque about the spacecraft center of mass 402 that is approximately equal to the torque resulting from solar impingement on the solar array 426. As a result, solar torque may be substantially balanced out.

Figure 5:
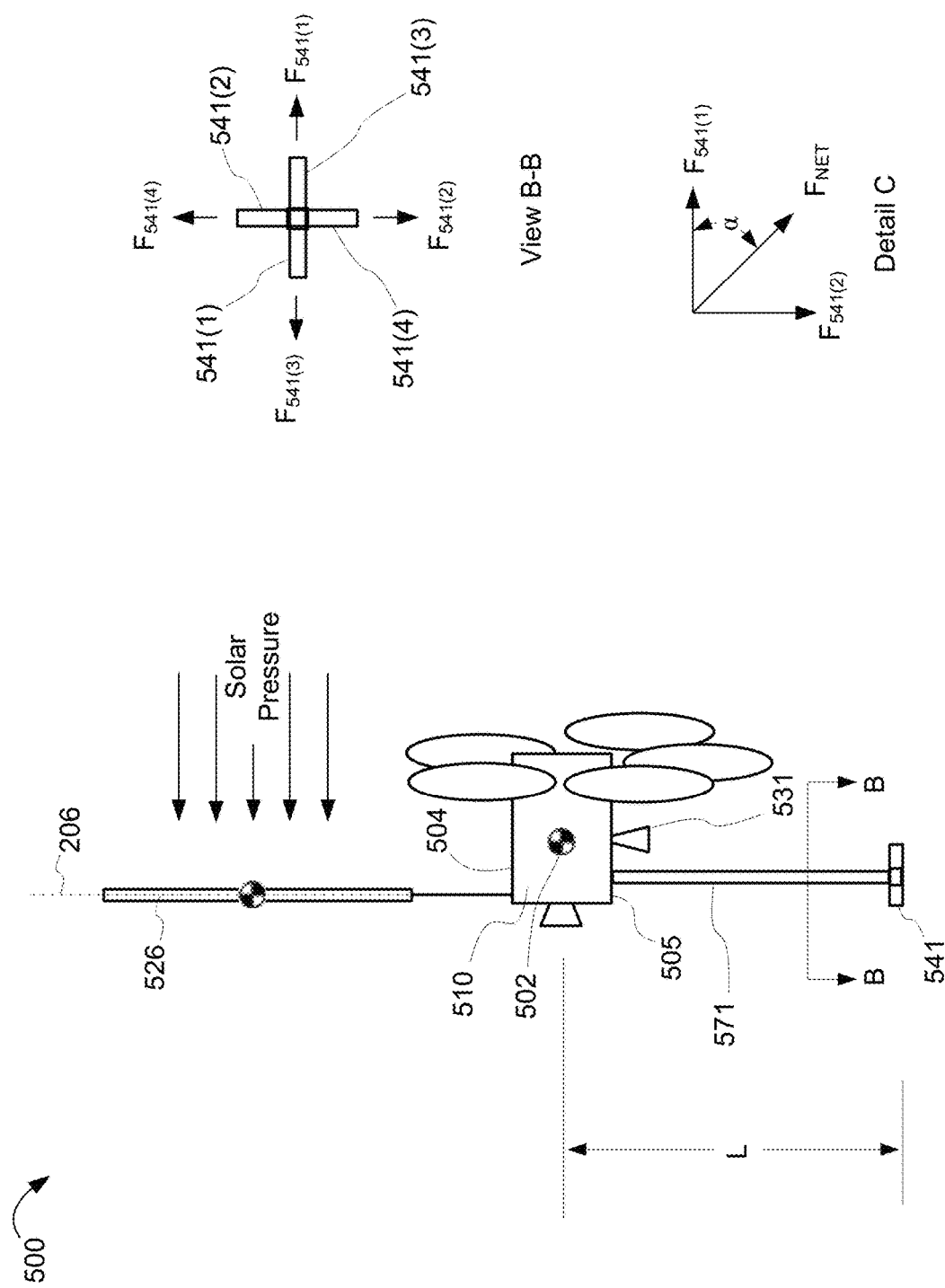
FIG. 5 illustrates a further example of a spacecraft in an on-orbit configuration including a self-balancing solar array according to an implementation.

FIG. 5 illustrates a spacecraft 500 in an on-orbit configuration, according to an implementation. In the illustrated implementation, a solar array 526 is extended, in an on-orbit configuration, outward from a main body 510 of the spacecraft 500. A proximal portion of the solar array 526 may be proximate to the first surface 504 of the main body 510.

In the illustrated implementation, a thruster 531 is disposed on the spacecraft main body 510 opposite to the solar array proximate to a second surface 505 opposite to the first surface 504. In some implementations, the thruster 531 may be configured to perform north south stationkeeping (NSSK) firings.

In the illustrated implementation, a number of low thrust thrusters 541 are disposed, in the on-orbit configuration, proximate to a distal portion of a boom (or "mast") 571. Mast 571 may be deployed from a launch configuration to the on-orbit configuration by way of one or more hinged joints, and linear and/or rotary actuators (not illustrated). The low thrust thrusters 541 may include electric thrusters such as colloid (electrospray) thrusters, pulse plasma thrusters, pulsed inductive thrusters or field emission electric propulsion thrusters. In some implementations, the electric thruster may be configured to operate at a very low thrust (micro newton range) and have a specific impulse of about 1000 seconds. The mast 571 may be configured so as to dispose thrusters 541 at a moment arm of length 'L' from the center of mass 502 of the spacecraft 500. The length L may be selected such that the torque provided by a nominal firing duty cycle of one of the thrusters 541 approximately balances the average solar torque imparted on the solar array 526.

In some implementations the mast 571 may, in the on-orbit configuration, be fixed with respect to the spacecraft main body 510. It will be appreciated that the relative direction of solar torque changes as a function of spacecraft orbital position. To counteract such variable torque with fixedly disposed thrusters 541, it is contemplated that a variably selected set of one or two thrusters 541 may be fired, so as to produce a synthetic thrust vector that produces a torque opposite to the solar torque. For example, referring to Detail C, simultaneous firing of thruster 541(1) and 541(2) may result in a synthetic thrust vector where a magnitude and orientation of vector $F_{NET}$ will vary as a function of average thrust level and/or duty cycle of thrusters 541(1) and 541(2). Accordingly, by judicious throttling and/or off pulsing of thrusters 541 a synthetic thrust vector effective to a substantially balanced out solar torque may be produced.

With regard to each of the above described implementations, it should be noted that one or more of the solar array 226, the solar array 326, the solar array 426 and the solar array 526 may be configured as a plurality of flat rigid panels that are reconfigured from a launch configuration to an on-orbit configuration by unfolding across one or more hinge lines. Alternatively, one or more of the solar array 226, the solar array 326, the solar array 426 and the solar array 526 may be flexible "roll-up" type solar panels. Other solar arrays, such as bi-fold arrays or "window blind" arrays are also within the contemplation of the present disclosure.

Thus, a spacecraft with a self-balancing solar array has been disclosed. The foregoing merely illustrates principles of the invention. It will thus be appreciated that those skilled in the art will be able to devise numerous systems and methods which, although not expressly shown or described herein, embody said principles of the invention and are thus within the spirit and scope of the invention as defined by the following claims.

What is claimed is:

1. A spacecraft having a center of mass and a pitch axis passing through the center of mass comprising:
a main body;
a first solar array; and
a first thruster; wherein
the spacecraft, in an on-orbit configuration, is operable in a geostationary orbit with the first solar array deployed, proximate to a first north or south surface of the main body, such that a rotational axis of the deployed first solar array is substantially parallel to the pitch axis;
the first thruster is disposed proximate to a second north or south surface of the main body, the first thruster having a thrust vector that is approximately coaligned with the pitch axis, the second surface being opposite to the first north or south surface, and no solar array being proximate to the second surface; and
the spacecraft further comprises a plurality of thrusters disposed, in the on-orbit configuration, proximate to a distal portion of a deployed mast, the deployed mast extending outboard from the second surface.

2. The spacecraft of claim 1, further comprising a second thruster disposed, in the on-orbit configuration, on a distal portion of the deployed first solar array, the second thruster having a thrust vector that is approximately orthogonal to the pitch axis and aligned with respect to a direction of impinging solar radiation such that firing the second thruster produces a torque opposite to a torque developed by the impinging solar radiation on the deployed first solar array.

3. The spacecraft of claim 2, wherein:
a solar array drive assembly (SADA) provides the only electrically conductive coupling between the main body and the first solar array; and
power for the second thruster is not conducted through the solar array drive assembly.

4. The spacecraft of claim 3, wherein the SADA is configured to rotate the first solar array about the rotational axis.

5. The spacecraft of claim 4, wherein the rotational axis is substantially co-aligned with the pitch axis.

6. The spacecraft of claim 2, wherein:
the second thruster includes a thruster control electronics unit; and
the thruster electronics control unit is communicatively coupled with the main body only by a radio frequency (RF) link between a remote RF node located proximate to the distal portion of the solar array and a spacecraft RF node located proximate to the main body.

7. The spacecraft of claim 2, wherein the second thruster includes a fuel supply module.

8. The spacecraft of claim 2, wherein the second thruster is one of a colloid thruster, a pulse plasma thruster, a pulsed inductive thruster or a field emission electric propulsion thruster.

9. The spacecraft of claim 1, wherein the spacecraft includes no solar array other than the first solar array.

10. The spacecraft of claim 1, wherein, in the on-orbit configuration, payload components, are deployed proximate to the second surface.

11. The spacecraft of claim 1, wherein the first thruster is configured for performing north south stationkeeping maneuvers.

12. The spacecraft of claim 1, wherein a synthetic thrust vector resulting from firing a selected one or more of the plurality of thrusters is approximately orthogonal to the pitch axis and is aligned with respect to a direction of impinging solar radiation such that firing the selected one or more of the plurality of thrusters produces a torque opposite to a torque developed by the impinging solar radiation on the deployed first solar array.

\* \* \* \* \*